United States Patent [19]
Nakamura et al.

[11] Patent Number: 5,847,839
[45] Date of Patent: Dec. 8, 1998

[54] IMAGE DATA OUTPUT DEVICE HAVING MEMORY MONITORING

[75] Inventors: Mitsuhiro Nakamura; Masaru Satoh, both of Osaka, Japan

[73] Assignee: Mita Industrial Co., Ltd., Osaka, Japan

[21] Appl. No.: 755,633

[22] Filed: Nov. 25, 1996

[30] Foreign Application Priority Data

Nov. 30, 1995 [JP] Japan .................................. 7-311887

[51] Int. Cl.$^6$ ...................................................... H04N 1/21
[52] U.S. Cl. ........................... 358/404; 358/444; 358/296
[58] Field of Search ............................ 395/115, 116; 358/471, 472, 474, 448, 449, 451, 444, 404, 406, 498, 296; 399/1

[56] References Cited

U.S. PATENT DOCUMENTS

| | | | |
|---|---|---|---|
| 4,876,609 | 10/1989 | Ogura | 358/443 |
| 5,206,684 | 4/1993 | Wada et al. | 395/115 |
| 5,241,397 | 8/1993 | Yamada | 358/444 |
| 5,257,035 | 10/1993 | Funahashi et al. | 355/23 |
| 5,270,830 | 12/1993 | Suzuki | 358/406 |
| 5,604,597 | 2/1997 | Imai | 358/296 |
| 5,724,490 | 3/1998 | Shibaki et al. | 395/114 |
| 5,774,758 | 6/1998 | Takahashi et al. | 358/296 |

FOREIGN PATENT DOCUMENTS 3-3220  1/1991  Japan .

*Primary Examiner*—Peter S. Wong
*Assistant Examiner*—Derek J. Jardieu
*Attorney, Agent, or Firm*—Beveridge, DeGrandi, Weilacher & Young, LLP

[57] ABSTRACT

An image data output device for restricting the storage of inputted image data in a memory and successively outputting the inputted image data, when the residual capacity of the memory has reduced to a predetermined value while the image data are being stored in the memory. After the input of the image data has been completed, the image data stored in the memory are read out and outputted.

10 Claims, 11 Drawing Sheets

F I G. 1
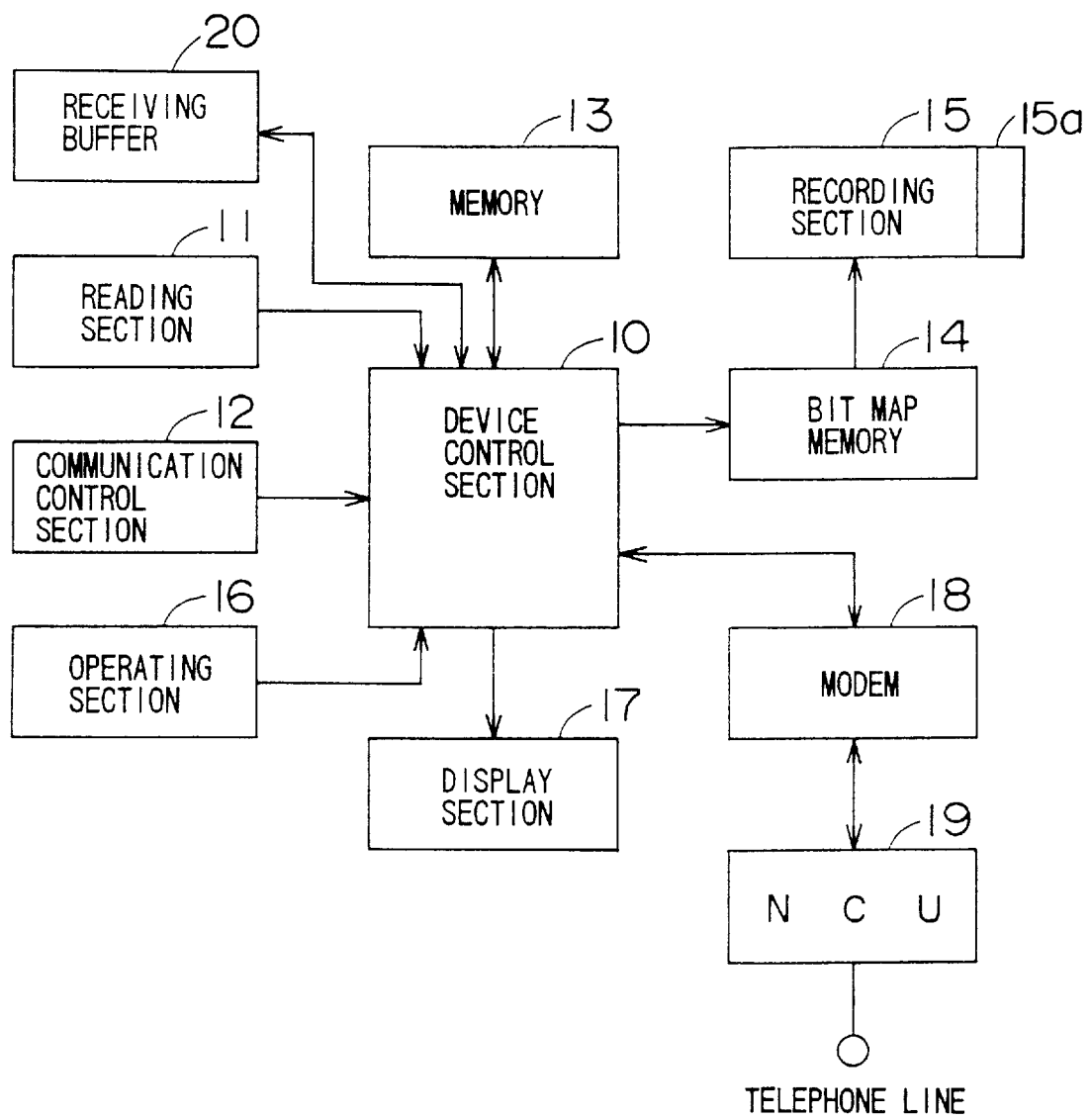

F I G. 1A
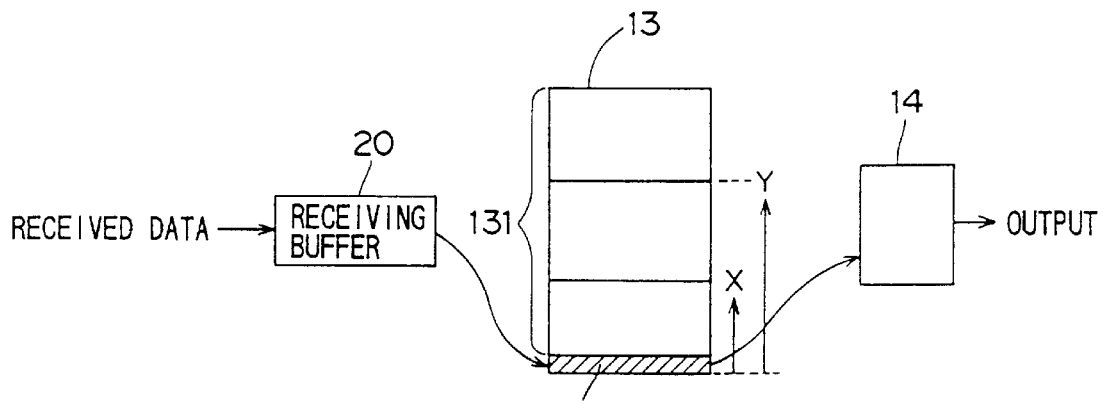
F I G. 1B
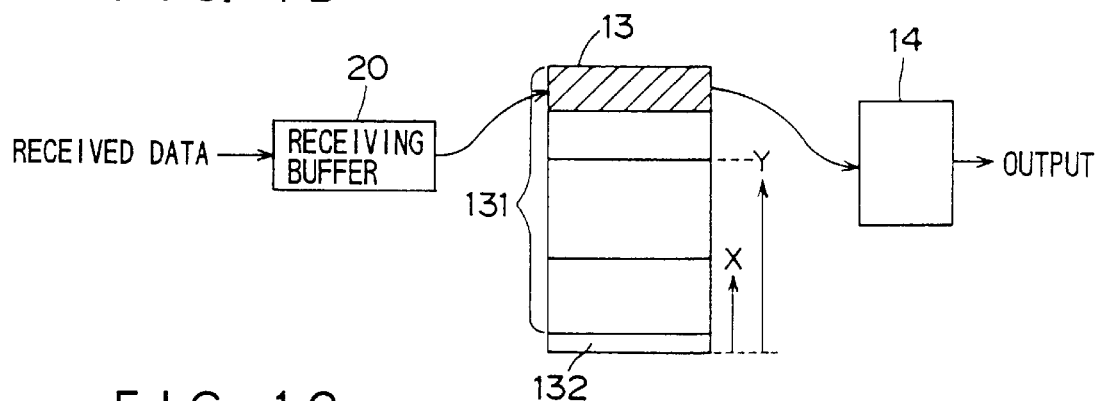
F I G. 1C
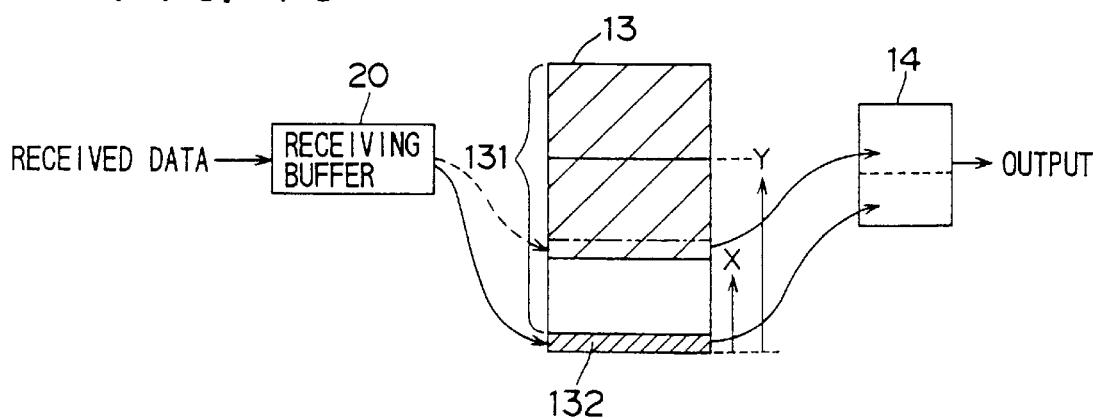

IMAGE DATA OUTPUT DEVICE HAVING MEMORY MONITORING

BACKGROUND OF THE INVENTION

1. Field of the Invention

The present invention relates to an image data output device for outputting inputted image data.

2. Description of the Related Art

In an image data output device such as a facsimile device or a digital copying machine, there is known a method of storing all image data inputted to the device in a memory once and controlling the order in which the image data are read out from the memory to sort paper sheets on which images are recorded. For example, Japanese Patent Publication No. 3220/1991 discloses, in a copying machine having a face-up output mechanism for discharging paper sheets with their recording surfaces directed upward, a method of reading out image data from a memory in the order opposite to the order in which the image data are stored in the memory and outputting the image data to the paper sheets, beginning with the image data corresponding to the final page, to discharge the paper sheets in a state where they are stacked with the page of the uppermost paper sheet being the first page.

Where the method disclosed in the above-mentioned publication is applied to a facsimile having a face-up output mechanism, all the image data received are stored once in the memory on the receiving side, and the image data are successively recorded and outputted, beginning with the image data corresponding to the final page. Consequently, the discharged paper sheets are stacked with the page of the lowermost paper sheet being the final page, whereby a receiver need not sort the paper sheets.

However, the capacity of the memory provided in the facsimile has a limitation. For example, if the number of originals to be received is large, the capacity of the memory is insufficient with respect to the quantity of image data corresponding to all the originals, whereby communication errors may, in some cases, occur due to memory overflow. If the communication errors occur, a transmitter must transmit the originals which have not been transmitted yet or all the originals again, whereby it takes time and labor.

Furthermore, the width of the originals which can be transmitted and received in the facsimile is currently regulated to not more than a predetermined width, while the length thereof is not regulated. Therefore, consider a case where image data corresponding to an original 20 shown in FIG. 11 which is long in the longitudinal direction (hereinafter referred to as a "long original 20") are received by the facsimile having the above-mentioned sorting function, and are outputted to cut paper sheets of predetermined size upon division. It is assumed that an image on the long original 20 is divided into three split portions 20A, 20B and 20C so as to correspond to the size of the cut paper sheets. It is assumed that the facsimile receives the image data, beginning with the image data corresponding to the split portion 20A, and records and outputs the image data, beginning with the image data corresponding to the split portion 20C, to sort the cut paper sheets.

All the image data corresponding to the long original 20 are stored once in the memory. Since data representing positions where the image on the long original 20 should be divided are not included in the received image data, it is necessary to develop the image data in a bit map memory for storing a bit image of an image recorded on one paper sheet and specify the positions where the image on the long original 20 is to be divided. When the image data corresponding to the split portion 20A are first developed, the bit map memory enters its full state. Consequently, the image data corresponding to the split portion 20B are then developed, whereby the bit map memory enters its full state again. The image data corresponding to the split portion 20C are then developed, and the development in the bit map memory is terminated, whereby the split portion 20C is specified. Thereafter, the image data corresponding to the split portion 20C are recorded and outputted. When the recording of the image data corresponding to the split portion 20C is terminated, the image data corresponding to the split portions 20A and 20B are developed in the bit map memory again, whereby the split portion 20B is specified, so that the image data corresponding to the split portion 20B are recorded and outputted. Further, the image data corresponding to the split portion 20A are developed in the bit map memory once again, and are recorded and outputted.

If the same data are developed in the bit map memory many times as described above, it takes long to output the data. Further, if it takes too long to output the data, the capacity of the memory for storing the received data may become insufficient while the data are being outputted, whereby the receiving is made impossible. Therefore, communication errors may, in some cases, occur.

SUMMARY OF THE INVENTION

A first object of the present invention is to provide an image data output device capable of inputting all image data even when the remaining capacity of a memory is insufficient.

A second object of the present invention is to provide a method of outputting image data which does not interfere with input of the image data even when the remaining capacity of a memory is insufficient.

A third object of the present invention is to provide an image data output device in which in outputting data representing an image of large size upon division, time required to output the data is short, and an input operation of the image data can be prevented from being interrupted as much as possible.

A fourth object of the present invention is to provide a method of outputting image data in which in outputting data representing an image of large size upon division, time required to output the data is short.

An image data output device according to the present invention comprises a memory for storing inputted image data. The storage of the inputted image data in the memory is restricted when the residual capacity of the memory has reduced to reach not more than (has decreased to) a first predetermined value X while the image data are being stored in the memory. Thereafter, the inputted image data are successively outputted by output means. On the other hand, the image data stored in the memory are outputted after the input of the image data has been completed, for example. Even when the residual capacity of the memory is insufficient, therefore, the image data can be successively inputted.

Furthermore, if the image data stored in the memory are outputted after the input of the image data has been completed, an output device is not dedicated to output of the image data in the memory during the input of the image data. Therefore, the input of the image data is not interrupted. When the image data output device is a facsimile device, for example, it is possible to prevent communication errors caused by interruption of a receiving operation.

Furthermore, when the image data are managed or controlled on the page by page basis, it is preferable that the image data corresponding to the page where the residual capacity of the memory reaches not more than the first predetermined value X while the image data are being inputted are outputted prior to outputting image data thereafter inputted. When the image data inputted for each page are outputted, therefore, the image data corresponding to each of the pages are prevented from being outputted with being divided into more than one portion.

When the residual capacity of the memory reaches not more than a second predetermined value Y in a case where the input of the image data is started, the inputted image data may be successively outputted upon restricting the storage of the inputted image data in the memory. Consequently, it is possible to reduce the possibility that the residual capacity of the memory becomes insufficient while the image data are being stored in the memory. In the facsimile device, data can be reliably received without causing communication errors or the like. The second predetermined value Y may be not less than the first predetermined value.

The image data output device according to one embodiment of the present invention further comprises a bit map memory in which the image data are developed in order to output the image data upon division for each predetermined unit quantity. The image data are developed in the bit map memory, and the image data in the bit map memory are outputted by the output device in response to that the bit map memory enters into its full state. When an inputted image on one page is so large in size as to be outputted upon being divided into a plurality of portions, for example, therefore, the image data are outputted in the order in which they are developed in the bit map memory, whereby time required to output the image data is short.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the electrical construction of a facsimile device according to one embodiment of the present invention;

FIGS. 1A, 1B and 1C are conceptual diagrams for explaining operations performed from the time when image data are received until the image data are developed in a bit map memory;

DESCRIPTION OF THE PREFERRED EMBODIMENTS

Figure 2:
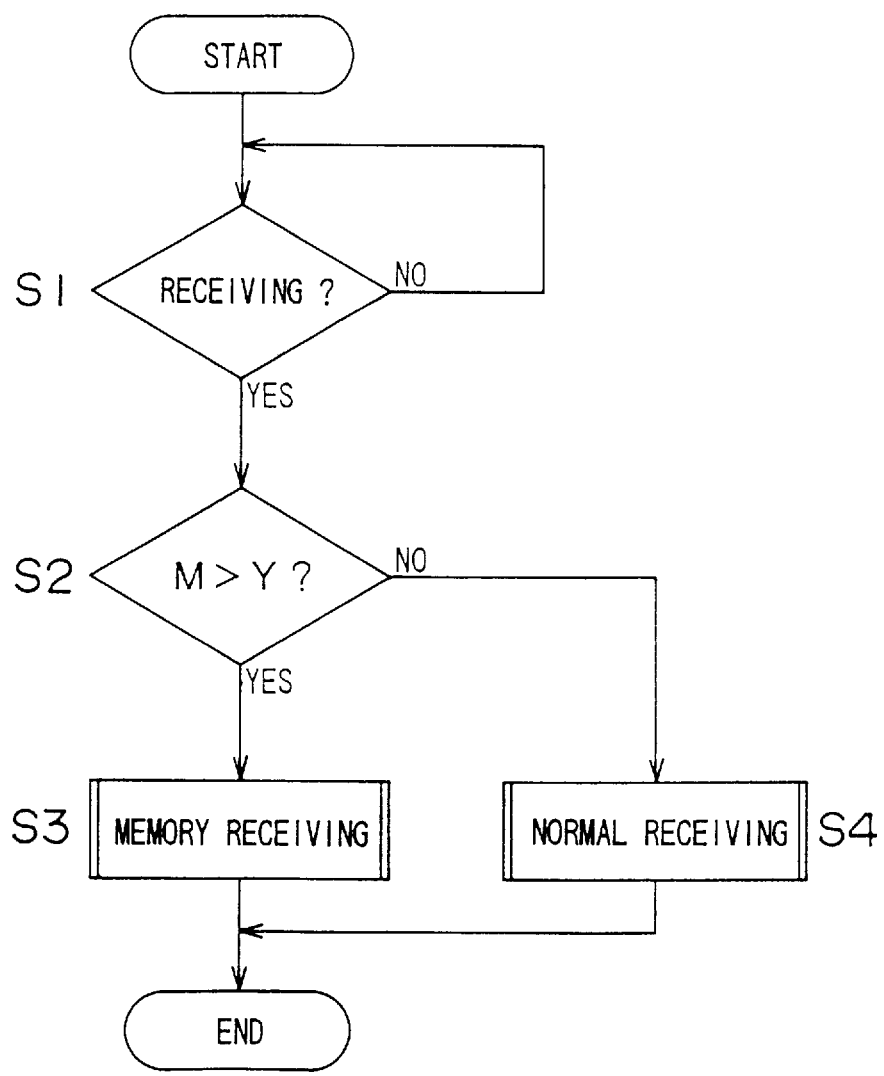
FIG. 2 is a flow chart for explaining a memory receiving operation of the facsimile.

FIG. 1 is a block diagram showing the electrical construction of a facsimile device according to one embodiment of an image data output device according to the present invention. The facsimile device includes a face-up discharge mechanism for discharging paper sheets on which received images are recorded with their recording surfaces directed upward.

A device control section 10 having a CPU and the like is connected to a public telephone line through a modem 18 and a network control unit (NCU) 19. Further, a receiving buffer 20 is connected to the device control section 10. Data representing the received images are stored in the receiving buffer 20 once with their code remaining as they are at the time of receiving, after which the code of the data is converted into a code in a predetermined coding scheme by the device control section 10. The device control section 10 converts a code in a scheme other than an MMR coding scheme (for example, an MR coding scheme) into an MMR code.

Furthermore, a memory 13 for storing received image data whose code has been converted into an MMR code, for example, a bit map memory 14 in which the received image data stored in the memory 13 are to be developed, a recording section 15 for recording and outputting the image data developed in the bit map memory 14 onto cut paper sheets of predetermined size, a communication control section 12 for producing a control signal required for facsimile communication, an operating section 16 having a keyboard and the like, and a display section 17 composed of a liquid crystal display device, for example, are connected to the device control section 10. The recording section 15 includes a face-up discharge mechanism 15a. Further, an output signal of a reading section 11 for optically reading an original to be transmitted is inputted to the device control section 10. The memory capacity of the bit map memory 14 is a sufficient capacity to store image data outputted to one paper sheet.

FIGS. 1A, 1B and 1C are conceptual diagrams for explaining receiving operations of the facsimile device. The facsimile device can perform a memory receiving operation for storing all received image data in the memory 13 once and a normal receiving operation for outputting, in parallel with the receiving of image data, the received image data to paper sheets. In FIGS. 1A, 1B and 1C, a region where received image data have been stored in a storage area of the memory 13 is indicated by hatching.

Referring now to FIG. 1A, the normal receiving operation will be described. The received image data are stored in the receiving buffer 20 once with their code remaining as they are at the time of receiving. The image data in the receiving buffer 20 are then quickly read out. When the code of the image data is a code in a coding scheme other than the MMR coding scheme, the code is converted into a code in the MMR coding scheme. The image data are stored in a spool area 132 provided in the memory 13. Thereafter, the image data in the spool area 132 are successively read out, are developed in the bit map memory 14, and are then recorded and outputted. The capacity of the spool area 132 is variable. An area other than the spool area 132 will be referred to as a memory receiving area 131.

Referring now to FIG. 1B, the memory receiving operation will be described. As in the above-mentioned normal receiving operation, the received image data are stored in the receiving buffer 20 once, and are then read out from the receiving buffer 20, whereby their code is converted into a code in the MMR coding scheme. The image data are stored in the memory receiving area 131 other than the spool area 132 of the memory 13. The image data in the memory receiving area 131 are developed in the bit map memory 14, and are recorded and outputted by the recording section 15 after all the received image data are stored in the memory 13 under a normal condition.

Furthermore, when the residual memory capacity M has reduced and reached not more than (has decreased to) a first defined value X during the memory receiving operation, an operation shown in FIG. 1C is performed. When the residual memory capacity M has reduced and reached not more than the first defined value X upon progress of the storage of the image data in the memory 13, the remaining image data corresponding to the page being received are stored in the receiving buffer 20 once, and are stored in the spool area 132 of the memory 13, as in the above-mentioned normal receiving operation. The image data corresponding to the page are developed in the bit map memory 14, beginning with the image data stored in the memory receiving area 131 of the memory 13 (a portion below a two-dot and dash line in FIG. 1C). Thereafter, the image data stored in the spool area 132 are developed. Further, image data to be thereafter received are processed by the normal receiving operation.

FIGS. 2 to 8 are flow charts for explaining the receiving operation of the facsimile device. Processing of the device control section 10 in the receiving operation described with reference to FIGS. 1A, 1B and 1C will be described in detail.

Figure 3:
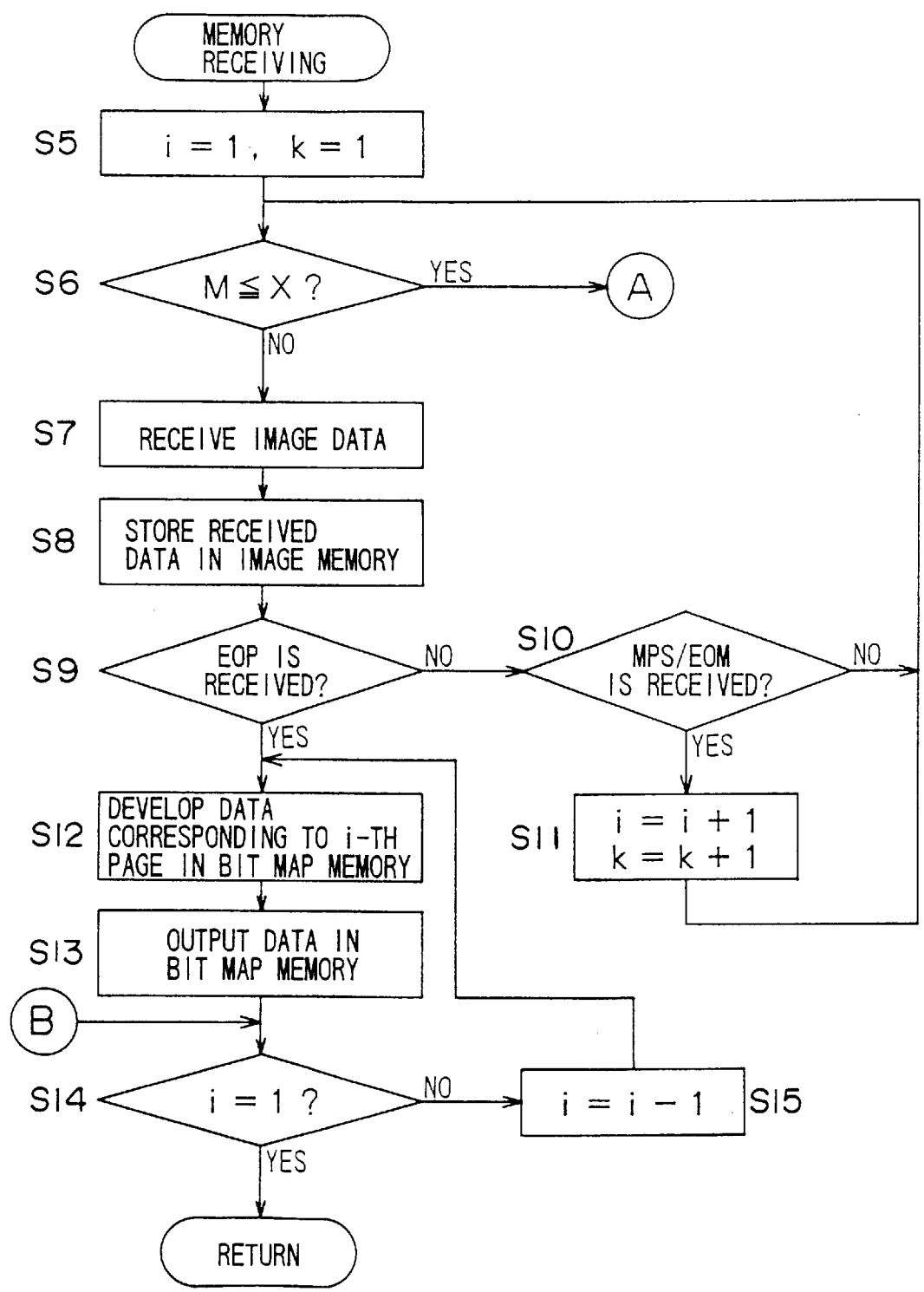
FIG. 3 is a flow chart for explaining a memory receiving operation in a case where the residual memory capacity is more than a first defined value X when a short image is received.
Figure 4:
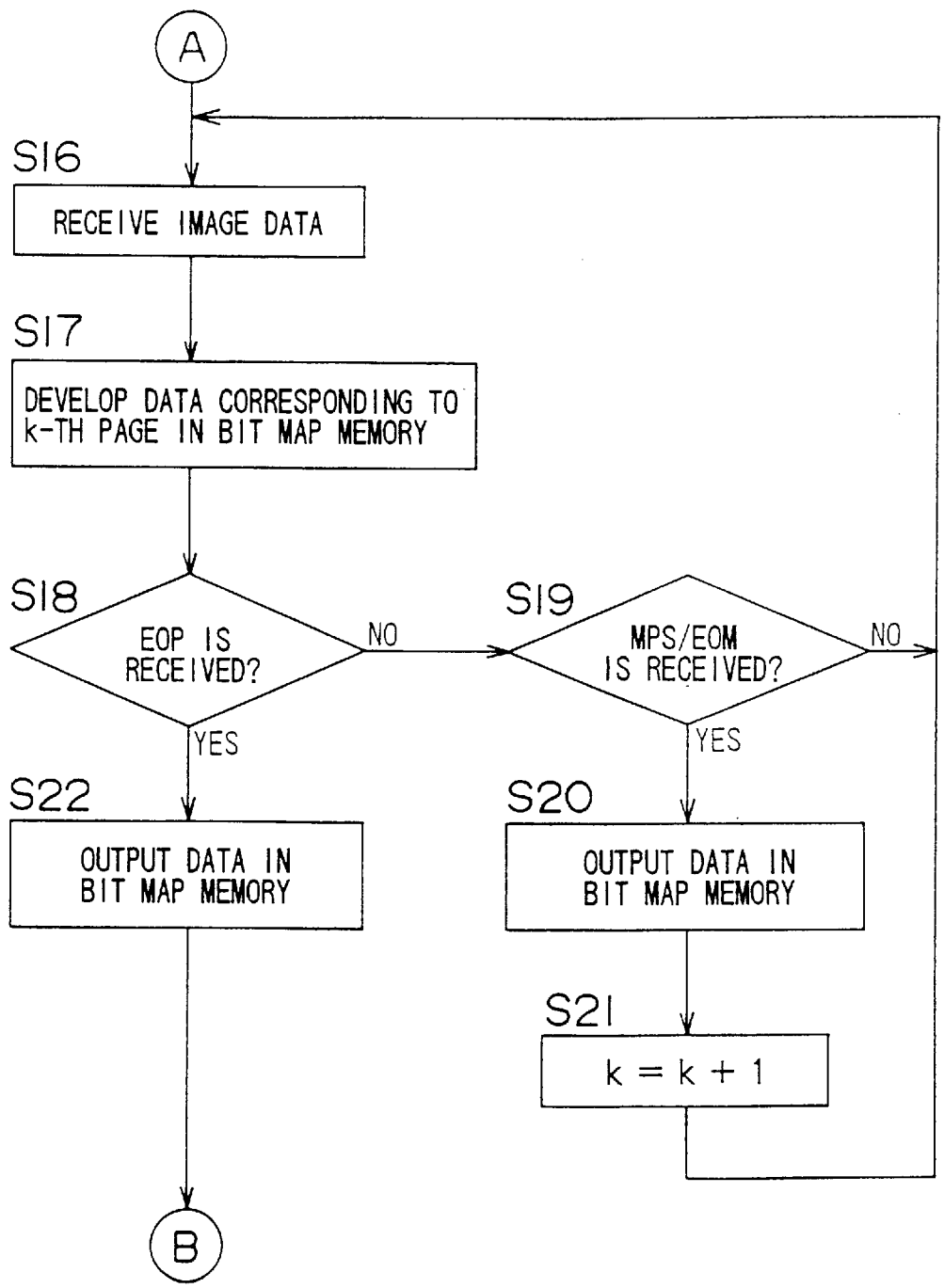
FIG. 4 is a flow chart for explaining a receiving operation in a case where the residual memory capacity is not more than a first defined value X when a short image is received.

Referring to FIG. 2, the device control section 10 judges whether or not the residual capacity M of the memory 13 is more than a second defined value Y (step S2) in response to receiving of facsimile device communication (step S1). The second defined value Y may be 128 kilobytes, for example. When the residual memory capacity M is more than the second defined value Y, a memory receiving operation shown in FIGS. 3 and 4 is started (step S3). When the residual memory capacity M is not more than the second defined value Y, a normal receiving operation shown in FIG. 5 is started (step S4).

Figure 5:
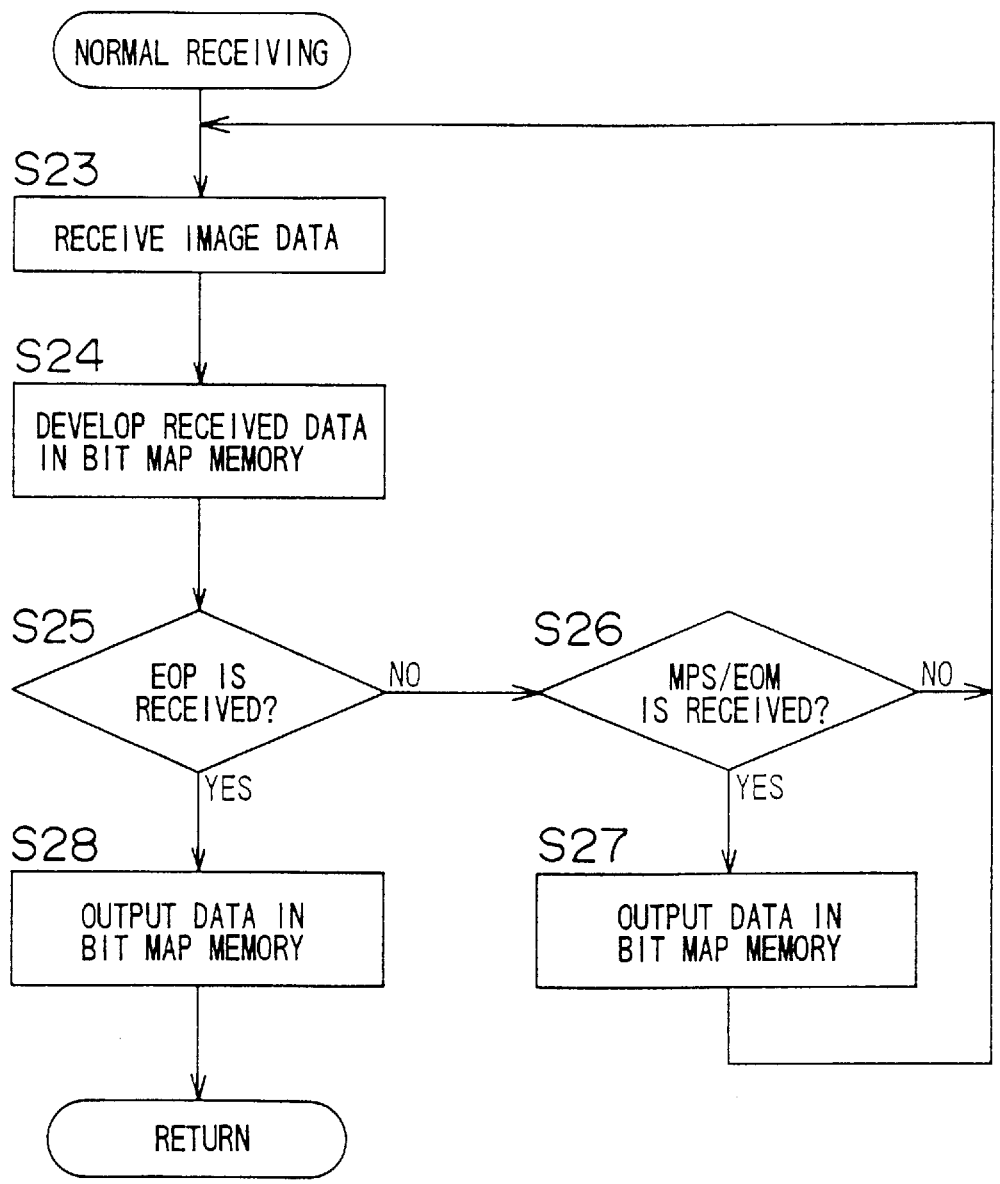
FIG. 5 is a flow chart for explaining a normal receiving operation in a case where a short image is received.

Referring now to FIGS. 3 to 5, description is made of a receiving operation in a case where a received image on one page is sufficiently short to be recorded on one paper sheet. Referring to FIG. 3, when the memory receiving operation is started, the device control section 10 first sets count values i and k to one (step S5). The count value i represents the number of pages corresponding to received images stored in the memory 13. On the other hand, the count value k represents the total number of pages corresponding to received images.

It is then judged whether or not the residual memory capacity M is not more than the first defined value X (step S6). The first defined value X is so determined as to satisfy X≦Y. The first defined value X may be set to 64 kilobytes, for example. If the residual memory capacity M is more than the first defined value X, the judgment is denied, after which the processing proceeds to the step S7. When the residual memory capacity M is not more than the first defined value X, the judgment is affirmed, after which the processing proceeds to the step S16 in FIG. 4.

As the first case, suppose a case where the residual memory capacity M does not reduce to not more than the first defined value X even if all image data representing the received images covering I pages are stored in the memory 13. If the judgment in the step S6 is denied, and the receiving of the image data corresponding to the first page is started in the step S7, the received image data are stored in the memory 13 in the order received (step S8). The storage of the image data is continued until the judgment in the step S9 is affirmed upon receiving of an EOP (End Of Procedures) signal meaning that the receiving of all image data is terminated. While the image data are being received and stored (the processing in the steps S7 and S8), monitoring is done in the step S6 to determine whether the residual memory capacity M reduces to not more than the first defined value X.

In a period during which the EOP signal is not received, monitoring is done to determine whether an MPS (MultiPage Signal) signal indicating the termination of pages corresponding to image data and an EOM (End Of Message) signal representing the start of transmission of image data corresponding to the succeeding page (step S10). When the MPS signal or the EOM signal is received, the device control section 10 judges that the receiving of the image data corresponding to the second page is started. One is added to the count values i and k (step S11), after which the processing is returned to the step S6. Since a case is assumed where the residual memory capacity M does not reduce to not more than the first defined value X even if all the received image data have been stored in the memory 13 as described above, the processing proceeds to the step S7 again from the step S6. In the step S7, the image data corresponding to the second page are also stored in the memory 13. Thereafter, the processing in the steps S6 to S11 is repeated. When it is confirmed in the step S9 that the EOP signal is received upon completion of the storage of the image data corresponding to the I-th page into the memory 13, the processing proceeds to the step S12. Both the count values i and k at this time are I.

In the step S12, the image data corresponding to the same page as the count value i, that is, the I-th page are read out from the memory 13, and are developed in the bit map memory 14. The image data developed in the bit map memory 14 are outputted onto the paper sheets (step S13). Thereafter, it is judged whether or not the count value i is one (step S13). If the count value i is not one, one is subtracted from the count value i (step S15). The processing is returned to the step S12 from the step S15. The image data corresponding to the (I-1)-th page are then developed in the bit map memory 14. The processing in the steps S13 to S15 is thereafter performed.

The processing in the steps S12 to S15 is repeated until the count value i becomes 1. When the count value i becomes 1, the judgment in the step S14 is affirmed, whereby the receiving operation is terminated.

The paper sheets on which the images are recorded are successively discharged, beginning with the paper sheet on which the image data corresponding to the I-th page are recorded, and the paper sheet corresponding to the first page is stacked uppermost. That is, the paper sheets on which the received images are recorded are stacked from the top in the order in which the images have been received. Consequently, a receiver need not rearrange the paper sheets in the order of the pages.

As a second case, suppose a case where the residual memory capacity M reduces and reaches not more than the first defined value X while image data corresponding to the J-th page out of received image data corresponding to a total of I pages are being stored in the memory 13. When the residual memory capacity M reaches not more than the first defined value X while the image data corresponding to the J-th page are being stored in the memory 13, the judgment in the step S6 in FIG. 3 is affirmed, after which the processing proceeds to the step S16 in FIG. 4. At this time, both the count values i and k are J. The receiving of the image data corresponding to the remaining part of the J-th page is continued in the step S16, and image data corresponding to the same page as the count value k are developed in the bit map memory 14 (step S17). Specifically, the image data corresponding to a part of the J-th page are read out from the memory 13, and are developed in the bit map memory 14, while the image data corresponding to the remaining part of the J-th page are stored once in the spool area 132, and are then developed in the bit map memory 14. The processing in the steps S16 to S19 is continued until the receiving of the EOP signal is confirmed in the step S18, or the receiving of the MPS signal or the EOM signal is confirmed in the step S19.

When the receiving of the MPS signal or the EOM signal is confirmed (step S19), the image data of the J-th page developed in the bit map memory 14 are recorded and outputted onto paper sheets (step S20). One is added to the count value k (step S21), that is, the count value k becomes (J+1), after which the processing is returned to the step S16. The processing in the steps S16 to S21 is repeated, so that the image data corresponding to the (J+1)-th page to the I-th page (the final page) are successively recorded and outputted. The received image data corresponding to the J-th page and the succeeding pages are thus soon read out, after they are stored once in the spool area 132 of the memory 13, are developed in the bit map memory 14, and are recorded and outputted. It is noted that part of the image data of the J-th page may be stored in the memory receiving area 131 in the memory 13 as described hereinbefore.

If the image data corresponding to the I-th page have been developed in the bit map memory 14, and when the receiving of the EOP signal is confirmed in the step S18, the image data corresponding to the I-th page developed in the bit map memory 14 are recorded and outputted onto paper sheets (step S22). The processing proceeds to the step S14 in FIG. 3. In the step S14, it is judged whether or not the count value i is one. At this time, the count value i is J, whereby the judgment in the step S14 is denied. In the step S15, one is subtracted from the count value i. That is, the count value i becomes (J-1), after which the processing proceeds to the step S12. Thereafter, the processing in the steps S12 to S15 is repeated until the count value i becomes 1, so that the image data corresponding to the first page to the (J-1)-th page stored in the memory 13 are recorded in the order opposite to the order received.

As described in the foregoing, the paper sheets on which the received images are recorded are stacked from the bottom in ascending order of pages, that is, the J-th page, the (J+1)-th page, the (J+2)-th page, . . . , the (I-1)-th page, the I-th page. Further, the paper sheets are stacked thereon in descending order of pages, that is, (J-1)-th page, the (J-2)-th page, . . . , the second page, the first page. That is, the paper sheets corresponding to the first page to the (J-1)th page which are discharged outward from the facsimile device are sorted in the order received, and the paper sheets corresponding to the J-th page and the succeeding pages are not sorted. At this time, a message indicating that the page sheets corresponding to the (J-1)-th page and the preceding pages are sorted, and the paper sheets corresponding to the J-th page and the succeeding pages are not sorted is displayed on the display section 17. Consequently, the receiver can know that it is necessary to sort the paper sheets corresponding to the J-th page and the succeeding pages upon seeing the displayed message.

On the other hand, when the residual memory capacity M is not more than the second defined value Y, the normal receiving operation shown in FIG. 5 is performed. Specifically, when the receiving of image data corresponding to the first page is started (step S23), the received image data are soon read out, although they are stored once in the spool area 132 of the memory 13, and are developed in the bit map memory 14 in the order received (step S24). The development in the bit map memory 14 is continued until it is judged in the step S25 that the EOP signal has been received or it is judged in the step S26 that the MPS signal or the EOM signal has been received. If it is judged that the MPS signal or the EOM signal as been received upon completion of the receiving of the image data corresponding to the first page, the image data developed in the bit map memory 14 are recorded and outputted (step S27). The processing in the steps S23 to S27 is repeated. When the EOP signal has been received upon completion of the receiving of the image data corresponding to the final page, the processing proceeds to the step S28. In the step S28, the image data corresponding to the final page developed in the bit map memory 14 are recorded and outputted. Consequently, all the received image data are recorded and outputted in the order received.

As described in the foregoing, in a case where the residual memory capacity M does not reduce and reach not more than the first defined value X even if all the received image data are stored in the memory 13, and the received image on one page can be recorded on one paper sheet, all the received image data are stored, and are recorded and outputted in the order opposite to the order stored. Consequently, the paper sheets on which the received images are recorded enter a state where they are stacked from the top in the order in which they receive the images, whereby the receiver need not sort the paper sheets.

When the residual memory capacity M reaches not more than the first defined value X in a state where the received image on one page can be recorded on one paper sheet, while the received image data are being stored in the memory 13, the succeeding received image data are soon read out after they have been stored once in the spool area 132 of the memory 13, and are recorded and outputted in the order received. Thereafter, the image data stored in the memory 13 are recorded and outputted in the order opposite to the order stored. Consequently, no communication errors occur due to insufficient residual memory capacity. With respect to the received image data stored in the memory 13, the paper sheets can be sorted in the order in which the images have been received. Consequently, the receiver need not sort the paper sheets with respect to this portion.

Furthermore, the image data received when the residual memory capacity M is less than the second defined value Y are not stored in the memory receiving area 131 of the memory 13, but are stored once in the spool area 132 of the memory 13. Thereafter, the image data are soon read out, and are recorded and outputted in the order received. Consequently, it is possible to reduce the possibility that the residual capacity of the memory 13 is insufficient while the image data are being stored in the memory 13.

Description is now made of a second embodiment of the present invention. Although in the above-mentioned first embodiment, description has been made of the processing in a case where the received image on one page can be recorded on one paper sheet, an image data output device according to the second embodiment has a function of outputting, when a received image on one page is too long to be contained in one paper sheet (in the case of a long image), the image onto a plurality of paper sheets upon division. Description is now made with reference to FIGS. 1, 2, and 6 to 8. In the following description, consider a case where the long image is recorded upon being divided into three split portions A, B and C so as to correspond to the size of cut paper sheets. It is assumed that image data representing the image are successively received, starting at the split portion A. Actually, the long image may, in some cases, be recorded upon being divided into two. Alternatively, the long image may, in the other cases, be recorded upon being divided into more than three. Processing in the steps T5 to T12 in FIG. 6 and processing in the steps T23 to T27 in FIG. 7 are respectively the same as the processing in the steps S5 to S12 in FIG. 3 and the processing in the steps S18 to S22 in FIG. 4 and hence, the detailed description thereof is omitted.

Figure 6:
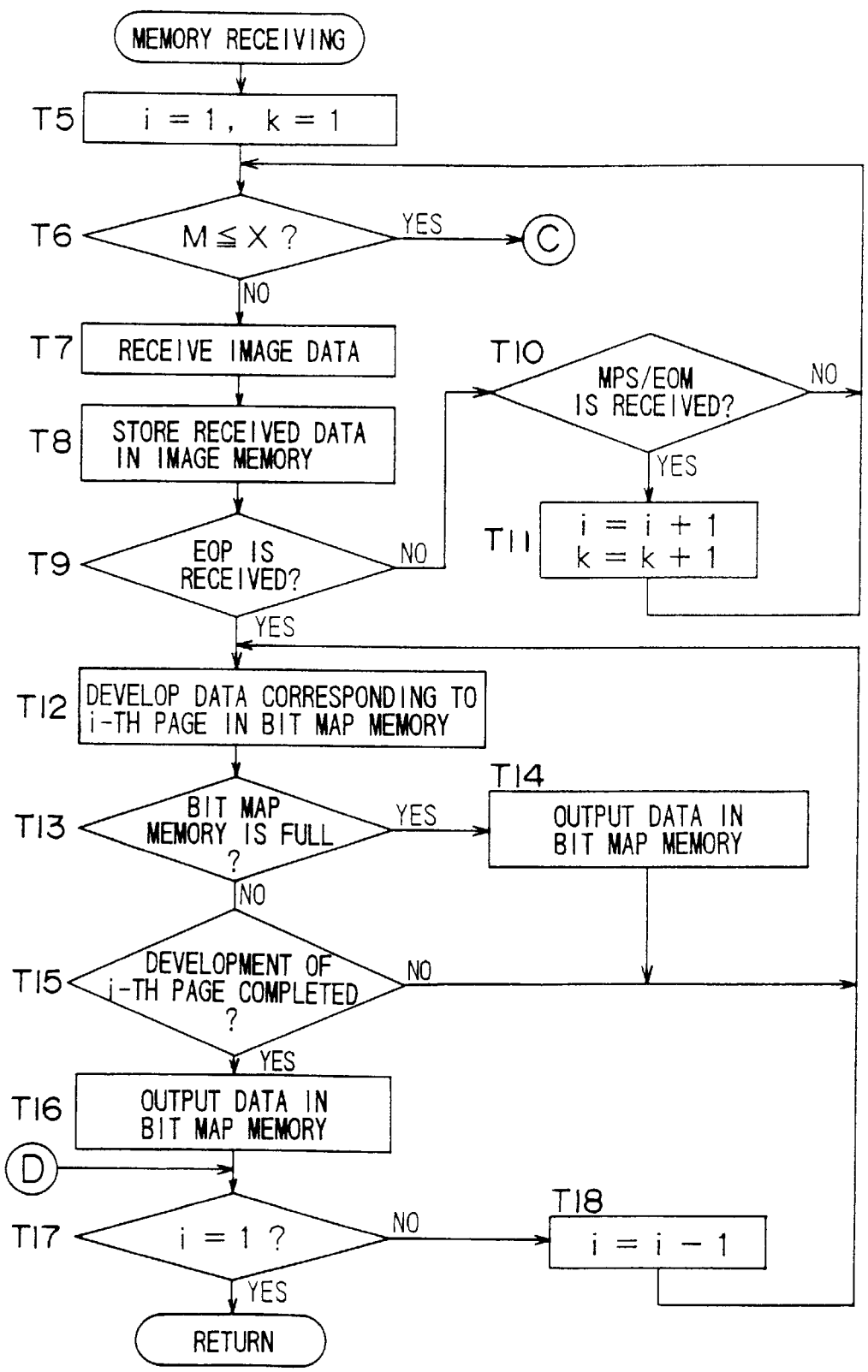
FIG. 6 is a flow chart for explaining a memory receiving operation in a case where the residual memory capacity is more than a first defined value X when a long image is received.
Figure 7:
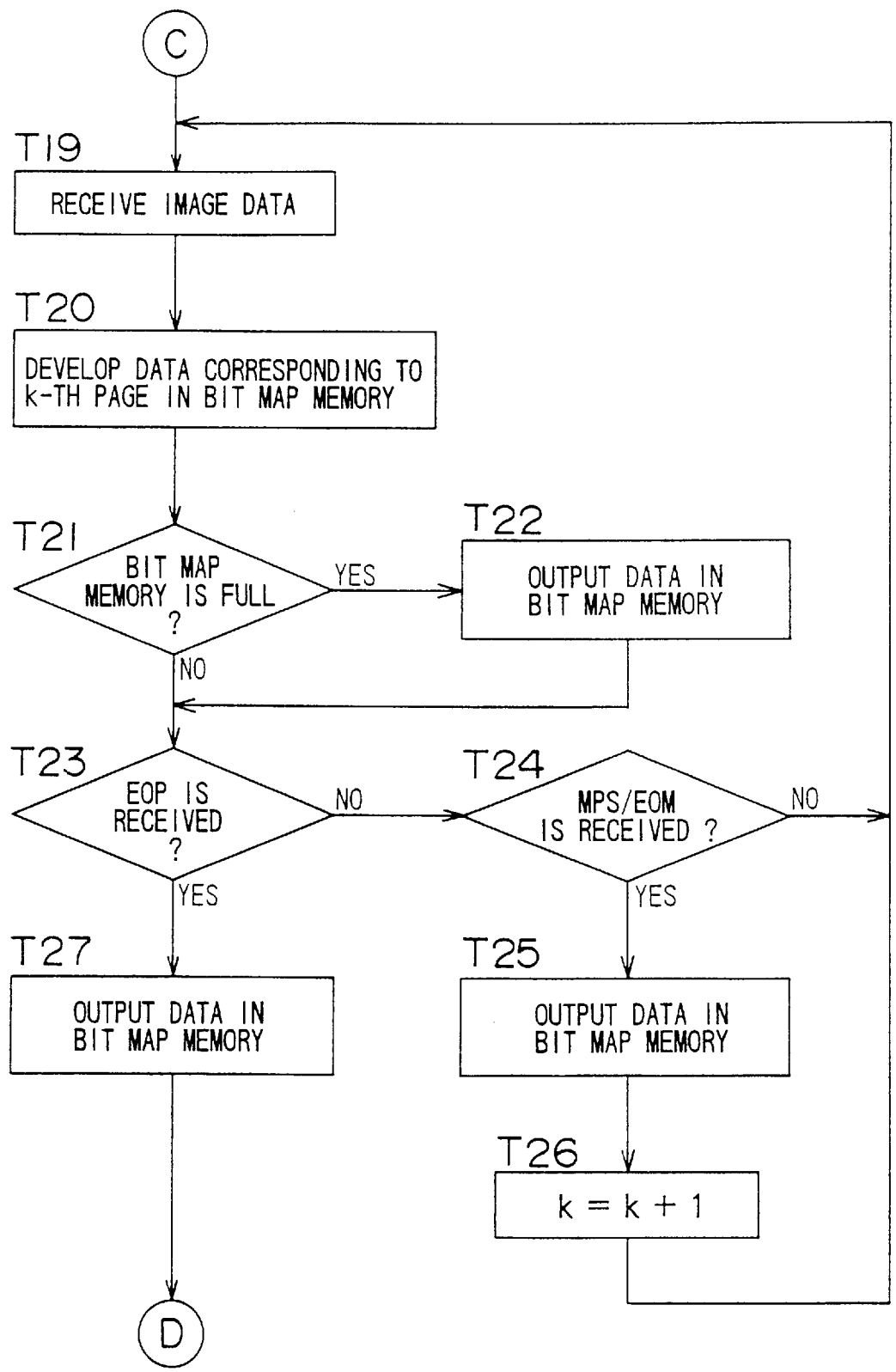
FIG. 7 is a flow chart for explaining a memory receiving operation in a case where the residual memory capacity is not more than a first defined value X when a long image is received.

When it is judged in the step S2 in FIG. 2 that the residual memory capacity M is more than a second defined value Y in a case where the long image is received, a memory receiving operation shown in FIG. 6 is started. First suppose a case where the residual memory capacity M does not reduce to reach not more than the first defined value X when received image data corresponding to a total of I pages are stored in the memory 13. In this case, the processing in the steps T6 to T11 is repeated. When the storage of all the image data corresponding to the I pages is completed, and an EOP signal is received, the processing proceeds to the step T12. Both count values i and k at this time are I.

In the step T12, the image data corresponding to the I-th page are first developed in the bit map memory 13 in the order in which they are stored in the memory 13. Specifically, the image data are developed, starting at the split portion A of the long image on the I-th page (hereinafter referred to as a "split portion IA"). When the image data corresponding to the split portion IA are developed, the bit map memory 14 enters its full state (step T13), and the image data developed in the bit map memory 14 are recorded and outputted onto paper sheets (step T14). Thereafter, the processing is returned to the step T12. In the step T12, the image data corresponding to the split portion B of the long image on the I-th page (hereinafter referred to as a "split portion IB") are developed in the bit map memory 14.

While the image data are developed in the bit map memory 14, the residual capacity of the bit map memory 14 is monitored in the step T13, and it is always examined in the step S15 whether or not all the image data corresponding to the I-th page are developed in the bit map memory 14. When the development of the image data corresponding to the I-th page is not completed, the judgment in the step T15 is denied, after which the processing is returned to the step T12. In the step S12, the image data are continuously developed in the bit map memory 14. The processing in the steps T12 to T15 is repeated. When all the image data corresponding to the split portion C of the long image on the I-th page (hereinafter referred to as a "split portion IC") are developed in the bit map memory 14, and the development of all the image data corresponding to the I-th page is confirmed, the image data are recorded and outputted (step T16). It is then examined whether or not the count value i is one (step T17). When the count value is not one, one is subtracted from the count value i (step T18), after which the processing proceeds to the step T12. In the step S12, the image data corresponding to the (I-1)-th page are developed.

The processing in the steps T12 to T18 is repeated. When the recording and output of the image data corresponding to the first page are completed, the count value i is one. Therefore, the judgment in the step T17 is affirmed, whereby the receiving operation is terminated.

Paper sheets to which the image data are recorded in the above-mentioned manner are discharged, beginning with the paper sheet on which the image data corresponding to the split portion IA are recorded, that is, paper sheets on which image data IA, IB, IC, (I-1)A, . . . , 1A, 1B, 1C are recorded are discharged in this order. Specifically, the paper sheets are not sorted with respect to the split portions of the long image, while being sorted with respect to the pages corresponding to received images. Consequently, a receiver has to sort the paper sheets only with respect to the split portions of the image received upon division.

Figure 9:
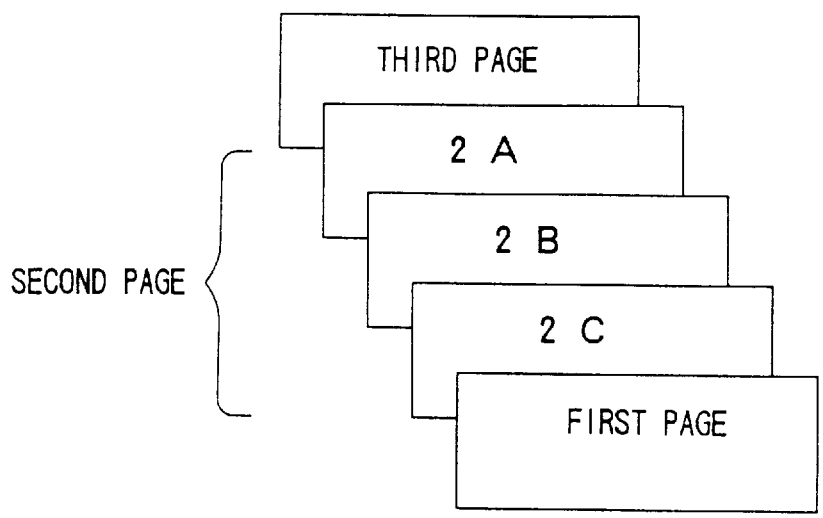
FIG. 9 is a diagram showing one example of the order in which paper sheets are discharged in a case where normal or short images and a long image are received upon being mixed.

Furthermore, when an image on the second page out of received images on a total of three pages, for example, is a long image, the paper sheets are sorted with respect to the pages corresponding to the received images, while the paper sheets are not sorted with respect to the split portions 2A, 2B and 2C of the long image on the second page as shown FIG. 9, and are successively outputted in the order in which the images have been received.

Then suppose a case where the residual memory capacity M reaches not more than a first defined value X while received image data corresponding to a total of I pages are being stored in the memory 13. For example, it is assumed that the residual memory capacity M reaches not more than the first defined value X while the image data corresponding to the J-th page are being stored in the memory 13. Processing at this time will be described. When the residual memory capacity M reaches not more than the first defined value X, the judgment in the step T6 in FIG. 6 is affirmed, after which the processing proceeds to the step T19 in FIG. 7. At this time, count values i and k are J. In the step T19, the receiving of the remaining image data corresponding to the J-th page is continued. On the other hand, the image data corresponding to a part of the J-th page stored in the memory 13 and the image data corresponding to the remaining part of the J-th page thereafter received are successively developed in the bit map memory 13 (step T20). Specifically, when the image on to the J-th page is an image to be divided into three split portions JA, JB and JC, image data representing the image are developed, starting at the split portion JA. When the bit map memory 14 enters its full state (step T21), the developed image data are recorded and outputted onto paper sheets (step T22). The development of the image data corresponding to the split portion of the image on the J-th page and the recording and output thereof are continued until the receiving of the EOP signal is confirmed in the step T23 or the receiving of the MPS signal or the EOM signal is confirmed in the step T24.

When the receiving of the MPS signal or the EOM signal is confirmed, the processing is returned to the step T19 through the processing in the steps T25 and T26. At this time, the count value k is (J+1). In the following, the processing in the steps T19 to T26 is repeated, so that the image data corresponding to the (J+1)-th page to the I-th page (the final page) are recorded and outputted.

When the image data corresponding to the final split portion IC of the long image on the I-th page are developed in the bit map memory 14, and it is confirmed in the step T23 that the EOP signal has been received, the image data corresponding to the split portion IC developed in the bit map memory 14 are recorded and outputted onto the paper sheets (step T27). The processing proceeds to the step T17 in FIG. 6. In the step T17, it is examined whether or not the count value i is one. At this time, the count value i is J. Therefore, the judgment in the step T17 is denied, after which one is subtracted from the count value i in the step T18. That is, the count value i becomes (J-1), whereby the processing proceeds to the step T12. The processing in the steps T12 to T15 is continued until the count value i becomes 1. Therefore, the paper sheets are not sorted with respect to the split portions of the long image stored in the memory 13, while being sorted with respect to the pages of the received images.

The order in which the paper sheets on which the received images are recorded in the above-mentioned manner are discharged is JA, JB, JC, (J+1)A, . . . , IA, IB, IC. Further, image data corresponding to the (J-1)-th page and the preceding pages which are stored in the memory 13 are recorded and outputted subsequently to recording and output of the image data corresponding to the split portion IC. Specifically, the order in which the paper sheets are discharged is (J-1)A, (J-1)B, (J-1)C, (J-2)A, . . . , 2C, 1A, 1B, 1C. Thus, the paper sheets corresponding to the first page to the (J-1)-th page are sorted as the order of pages of the received images, while the paper sheets corresponding to the J-th page and the succeeding pages are not sorted. At this time, a message indicating that the paper sheets corresponding to the (J-1)-th page and the preceding pages are sorted, while the paper sheets corresponding to the J-th page and the succeeding pages are not sorted is preferably displayed on the display section 17. Consequently, the receiver is to sort the paper sheets corresponding to the J-th page and the succeeding pages, and further sort the paper sheets with respect to the split portions of the image received upon division.

Figure 10:
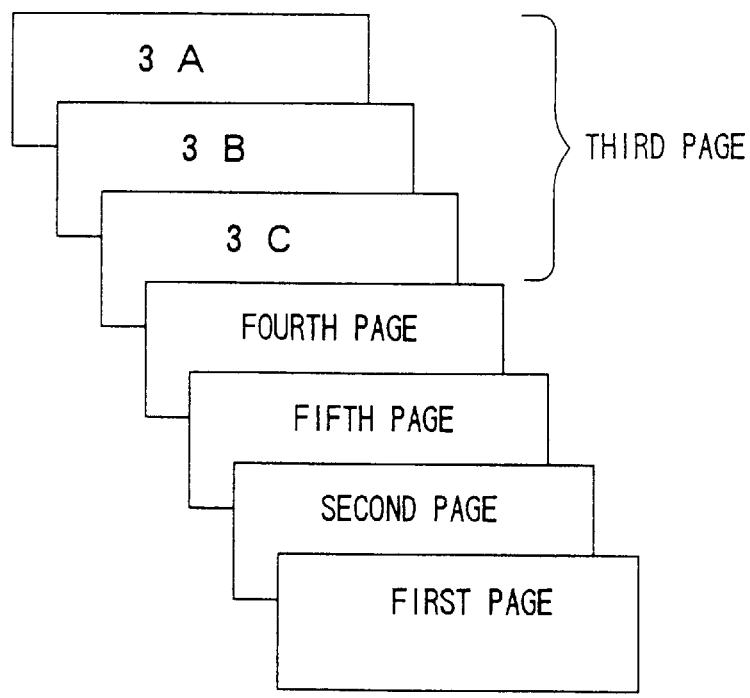
FIG. 10 is a diagram showing another example of the order in which paper sheets are discharged in a case where normal or short images and a long image are received upon being mixed.
Figure 11:
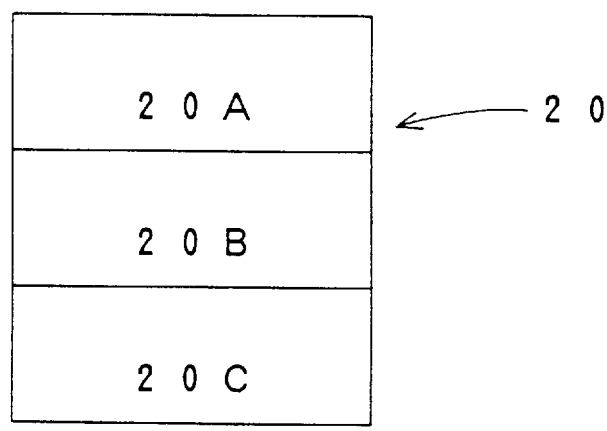
FIG. 11 is a plan view showing a long original.

Furthermore, when only an image on the third page out of received images on a total of five pages, for example, is a long image, the order in which the paper sheets are discharged in a case where the residual memory capacity M reaches not more than the first defined value X while the image data corresponding to the third page are being received is as shown in FIG. 10. That is, the order in which the paper sheets are discharged is 3A, 3B, 3C, 4 and 5, after which the paper sheets are sorted with respect to the first page and the second page, whereby the paper sheets corresponding to the second page and the first page are discharged in this order.

Figure 8:
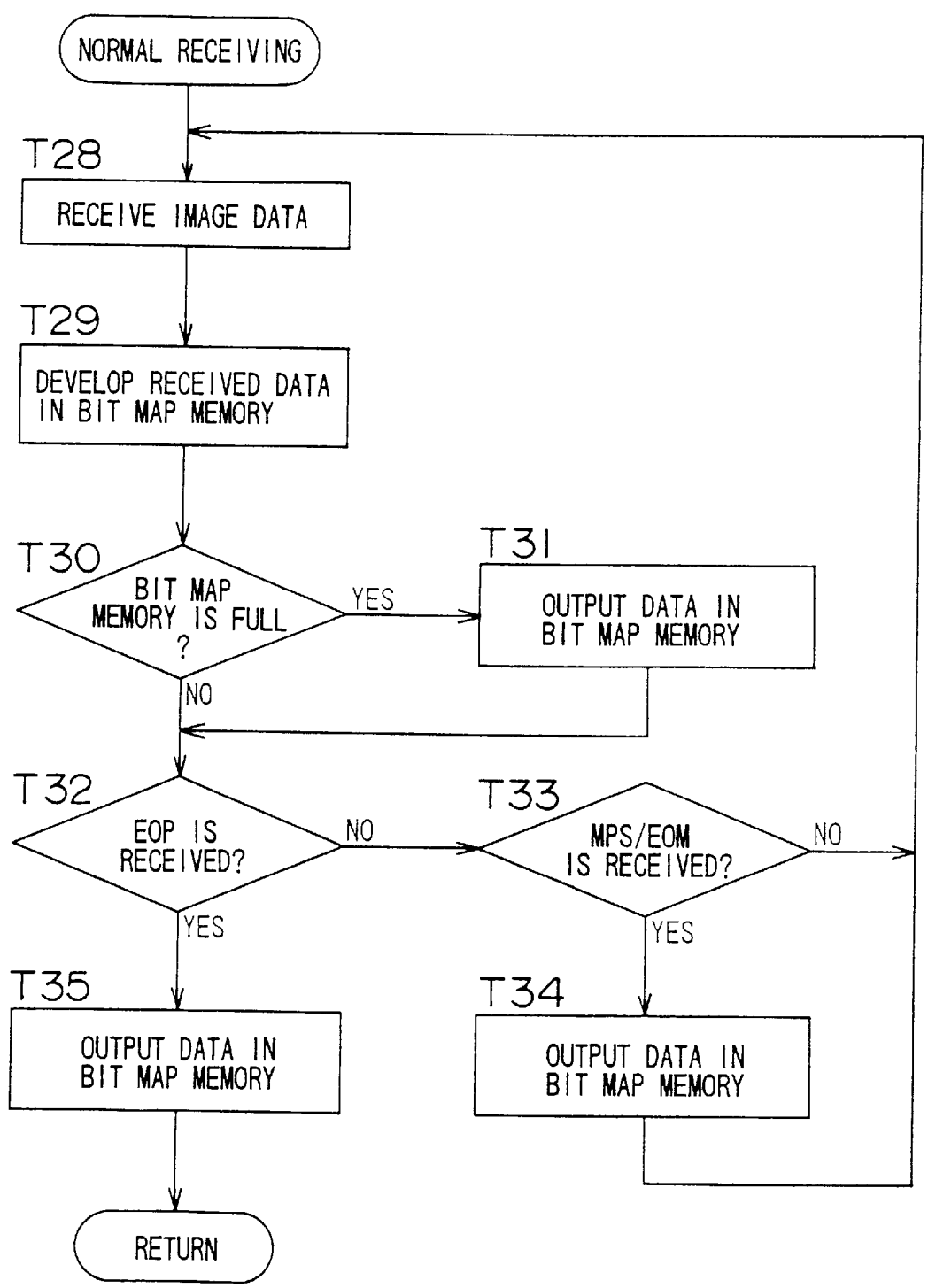
FIG. 8 is a flow chart for explaining a normal receiving operation performed when a long image is received.

On the other hand, if the residual memory capacity M is not more than the second defined value Y, the normal receiving operation shown in FIG. 8 is performed. When the receiving of image data corresponding to the first page is started (step T28), the received image data are successively developed in the bit map memory 14 (step T29). When the bit map memory 14 enters its full state, the judgment in the step T30 is affirmed, whereby the image data developed in the bit map memory 14 are recorded and outputted onto the paper sheets (step T31).

When the bit map memory 14 does not enter its full state, so that the judgment in the step T30 is denied, it is judged in the step T32 whether or not the EOP signal is received. When the judgment is denied, it is judged in the step T33 whether or not the MPS signal or the EOM signal is received. When the judgment in the step T33 is affirmed, so that it is confirmed that the receiving of the image data corresponding to the succeeding page is started, the image data developed in the bit map memory 14 at that time are recorded and outputted (step T34). The processing is returned to the step T28. In the step T28, a recording and outputting operation of image data corresponding to the succeeding page is started. The above-mentioned processing is repeated until it is confirmed in the step T32 that the EOP signal is received. When the judgment in the step T32 is affirmed upon receiving of the EOP signal, the image data remaining in the bit map memory 14 are recorded and outputted (step T35). When image data representing the long image are normally received, the image data are stored once in the spool area 132 of the memory 13, are then soon developed in the bit map memory 14, and are recorded and outputted.

As described in the foregoing, according to the present embodiment, in a case where the residual memory capacity M does not reach not more than the first defined value X even if all the received image data are stored in the memory 13, all the received image data are stored in the memory 13. The received image data are recorded and outputted in the order opposite to the order of pages at the time of receiving. However, with respect to the long image, the image data corresponding to the split portions on the same page are recorded and outputted in the same order as the order received. The reason for this is that if the paper sheets are sorted with respect to the split portions, the number of times of development of the image data in the bit map memory 14 is increased, whereby it takes long to receive the image data, and communication errors may occur.

Furthermore, when the residual memory capacity M reaches not more than the first defined value X while the image data are being received, the succeeding received image data are soon read out after they are stored once in the spool area 132 of the memory 13, and are recorded and outputted in the order received. Thereafter, the image data stored in the memory 13 are recorded and outputted in the order of pages opposite to the order of pages at the time of receiving. At this time, the paper sheets are not sorted with respect to the split portions of the long image. Consequently, no communication errors occur due to the fact that it takes too long for memory overflow and receiving.

Additionally, the image data received when the residual memory capacity M is less than the second defined value Y at the time of starting receiving are soon read out after they are stored once in the spool area 132 of the memory 13, and are recorded and outputted in the order received. Accordingly, the paper sheets are not sorted. Consequently, it is possible to reduce the possibility that the residual capacity of the memory 13 is insufficient while the image data are being stored in the memory 13.

Although description has been now made of the two embodiments of the present invention, the present invention is not limited to the above-mentioned embodiments. Although description has been made by taking the facsimile device as an example in the above-mentioned embodiments, the present invention is also applicable to an image data output device such as a digital copying machine. Specifically, in the digital copying machine, if image data acquired by a scanner section are stored once in a memory, the image data are read out from the memory in the order of pages opposite to the order of pages at the time of input, and are fed to a printer section, paper sheets on which copied images are recorded can be stacked on a discharge tray in a state where they are sorted. In this case, when the capacity of the memory is insufficient, the image data from the scanner section may be fed to the printer section as they are upon interruption of the input of the image data to the memory. At this time, the image data acquired in the scanner section may be outputted after the data in the memory are outputted. However, it is preferable that the data in the memory are outputted after the image data acquired in the scanner section are outputted because an original reading operation in the scanner section is not interrupted.

Furthermore, the image data may be outputted to not paper sheets but a CRT display or the like or may be recorded on a floppy disk or the like. Further, a message relating to sorting of paper sheets may be printed on paper sheets or reported by voice instead of being displayed on a display unit.

Although the present invention has been described and illustrated in detail, it is clearly understood that the same is by way of illustration and example only and is not to be taken by way of limitation, the spirit and scope of the present invention being restricted only by the terms of the appended claims.

What is claimed is:

1. An image data output device comprising:

a memory for storing inputted image data;

output means for outputting the image data;

first control means for restricting the storage of the inputted image data in the memory when a residual capacity of the memory decreases to a first predetermined value X while the image data are being stored in the memory, and for causing the output means to successively output unstored input image data without storing the unstored image data in the memory; and second control means for reading out the image data stored in the memory and for causing the output means to output the image data thus read out after the output means has completed successive outputting of the unstored input image data.

2. An image data output device according to claim 1, wherein the image data are managed on a page by page basis, and the second control means reads out the image data stored in the memory in an order opposite to an order of pages at the time of the input, and causes the output means to output the image data thus read out.

3. An image data output device according to claim 1, wherein the image data are managed on a page by page basis, and the first control means includes means for causing the output means to output the image data corresponding to another page after the residual capacity of the memory has decreased to the first predetermined value X while the image data are being inputted, prior to outputting image data thereafter inputted.

4. An image data output device according to claim 1, further comprising third control means for restricting the storage of the inputted image data in the memory, and for causing the output means to successively output the inputted image data, if the residual capacity of the memory is not more than a second predetermined value Y when the input of the image data is started, the second predetermined value Y being not less than the first predetermined value X.

5. An image data output device according to claim 1, further comprising a bit map memory in which the image data are developed in order to output the image data such that the image data is page unit quantities, and fourth control means for developing the image data into the bit map memory, and for causing the output means to output the image data in the bit map memory when the bit map memory has become full.

6. An image data output device according to claim 1, wherein the memory can store image data corresponding to a plurality of pages, and the second control means reads out the image data corresponding to the plurality of pages stored in the memory in an order of pages opposite to an order of pages at the time of the input and causes the output means to output the image data read out, the device further comprising report means for reporting, when the inputted image data are outputted in the order of pages conforming to the order inputted under a control operation by the first control means, information about the order of pages of the outputted image data.

7. An image data output device according to claim 1, wherein the image data output device is a facsimile device, the memory stores the image data received from a terminal on a transmission side connected through a communication line, and the output means outputs the image data onto sheets.

8. A method of outputting image data, comprising the steps of:

storing inputted image data in a memory;

restricting the storage of the inputted image data into the memory if a residual capacity of the memory decreases to a first predetermined value X while the image data are being stored into the memory;

successively outputting unstored inputted image data without storing the unstored inputted image data in the memory if the storage of the inputted image data in the memory is restricted; and outputting the image data stored in the memory after successive outputting of the unstored inputted image data has been completed.

9. A method according to claim 8, further comprising the step of restricting the storage of the inputted image data into the memory if the residual capacity of the memory is not more than a second predetermined value Y when the input of the image data is started.

10. A method according to claim 9, wherein the image data are managed on a page by page basis, the method further comprising the step of outputting the image data stored in the memory in an order of pages opposite to an order of pages at the time of the input after the input of the image data has been completed.

* * * * *